United States Patent [19]
Nagayasu et al.

[11] Patent Number: 5,660,441
[45] Date of Patent: Aug. 26, 1997

[54] TILT-TYPE HEADREST

[75] Inventors: Hidetaka Nagayasu; Tokuji Kondo, both of Toyota, Japan

[73] Assignee: Araco Kabushiki Kaisha, Aichi-ken, Japan

[21] Appl. No.: 633,706

[22] Filed: Apr. 19, 1996

[30] Foreign Application Priority Data

Apr. 20, 1995 [JP] Japan ................................ 7-095488
Oct. 25, 1995 [JP] Japan ................................ 7-277984

[51] Int. Cl.$^6$ .................................................. A47C 7/36
[52] U.S. Cl. ................................. 297/408; 297/391
[58] Field of Search .............................. 297/391, 403, 297/408, 409

[56] References Cited

U.S. PATENT DOCUMENTS

| 4,685,737 | 8/1987 | Deley et al. | 297/408 |
| 4,991,907 | 2/1991 | Tanaka | 297/408 |

FOREIGN PATENT DOCUMENTS

| 2647725 | 4/1978 | Germany | 297/408 |
| 4-38755 | 9/1992 | Japan. | |

*Primary Examiner*—Milton Nelson, Jr.
*Attorney, Agent, or Firm*—Hazel & Thomas

[57] ABSTRACT

A tilt-type headrest mounted on an upper horizontal portion of an arched support rod to be mounted on a backrest of a passenger seat, which headrest includes a headrest frame formed with a cylindrical hinge portion retained in frictional engagement with the horizontal portion of the support rod and a pair of opposed plate-like body portions extending in parallel from the hinge portion, the plate-like body portions each being integrally formed with an inwardly curled rim portion at their upper peripheries and both side peripheries and formed with a pair of laterally spaced joint portions at both sides of the hinge portion, the inwardly curled rim portions and the joint portions being engaged with each other in a condition where the headrest frame has been folded at its hinge portion to oppose the plate-like portions to one another and a pair of laterally spaced clamp members each formed with a cylindrical hinge portion retained in frictional engagement with the horizontal portion of the support rod and a pair of attachment portions extending in parallel from the hinge portion of each of the clamp members and fastened to each pair of the joint portions of the opposed plate-like portions, wherein the horizontal portion of the support rod is integrally formed with an arched projection at its center to be selectively engaged with opposed internal surfaces of the plate-like body portions for restricting forward or backward movement of the headrest frame.

7 Claims, 15 Drawing Sheets

TILT-TYPE HEADREST

BACKGROUND OF THE INVENTION

1. Field of the Invention

The present invention relates to a tilt-type headrest adapted for use in a passenger seat of automotive vehicles.

2. Description of the Prior Art

Illustrated in FIGS. 26 and 27 is a conventional headrest of the tilt-type which includes an arched support rod 1 to be mounted on a backrest of a passenger seat, a pair of laterally spaced brackets 2 welded to the upper horizontal portion of the arched support rod 1 and an arched headrest frame 3 of U-letter shape in cross-section pivoted to the brackets 2 by means of a pair of stepped pins 4 and covered with a headrest pad 7 of synthetic resin. The stepped pins 4 each are fastened to the headrest frame 3 through a washer 6, and a dish spring 5 is interposed between the head portion of stepped pin 4 and bracket 2 to cause frictional force between the bracket 2 and headrest frame 3 for retaining the headrest pad 7 at a desired angular position. An extent for restricting forward or backward movement of the headrest pad 7 is defined by abutment of the brackets 2 against the internal surface of the headrest frame 3.

In a conventional adjustment device of a headrest disclosed in Japanese Utility Model Publication 4(1992)-38755, a headrest frame is supported by a pair of U-letter shaped leaf springs which are engaged with the upper horizontal portion of an arched rod and riveted to the headrest frame for supporting the headrest frame.

During manufacturing process of the conventional headrest, the headrest frame is set within a mold after assembled with the arched support rod, and an amount of urethane resin added with a foaming agent is filled in the mold to integrally form the headrest pad with the headrest frame. In the conventional headrest illustrated in FIGS. 28 and 27, however, a portion of the headrest pad 7 gets into a space between the bracket 2 and headrest frame 3. This results in an obstacle to adjustment of the headrest. If caught in between the bracket 2 and headrest frame 3, the headrest pad 7 is partly broken and damaged in its entirety. For the foregoing reasons, it is very difficult to enhance productivity of the headrest pad 7.

In the conventional headrest disclosed in Japanese Utility Model Publication No. 4(1992)-38755, the angular adjustment of the headrest is difficult due to lack of means for restricting movement of the headrest in a predetermined extent. Since in the conventional headrest, an amount of urethane resin is filled in the entire space in the mold for forming the headrest pad, a large amount of urethane resin is required.

SUMMARY OF THE INVENTION

It is, therefore, a primary object of the present invention to provide a tilt-type headrest capable of overcoming the problems discussed above.

According to the present invention, the object is accomplished by providing a tilt-type headrest mounted on an upper horizontal portion of an arched support rod to be mounted on a backrest of a passenger seat, which headrest comprises a headrest frame formed with a cylindrical hinge portion retained in frictional engagement with the upper horizontal portion of the support rod and a pair of opposed plate-like body portions extending in parallel from the hinge portion, the plate-like body portions each being integrally formed with an inwardly curled rim portion at their upper peripheries and both side peripheries and formed with a pair of laterally spaced joint portions at both sides of the cylindrical hinge portion, wherein the inwardly curled rim portions and the joint portions of the plate-like body portions are engaged with each other in a condition where the headrest frame has been folded at the hinge portion to oppose the plate-like portions to one another; and a pair of laterally spaced clamp members each formed with a cylindrical hinge portion retained in frictional engagement with the upper horizontal portion of the support rod and a pair of attachment portions extending in parallel from the hinge portion of each of the clamp members and fastened to each pair of the joint portions of the opposed plate-like body portions; wherein the upper horizontal portion of the support rod is integrally formed with a radial projection at its center to be selectively engaged with opposed internal surfaces of the plate-like body portions for restricting forward or backward movement of the headrest frame, and wherein the headrest frame and the clamp members are covered with a headrest pad integrally formed therewith.

According to an aspect of the present invention, the headrest pad is integrally formed with the headrest frame by foaming process in a condition where the headrest has been assembled with the upper horizontal portion of the support rod.

According to another aspect of the present invention, the pair of clamp members are integrally formed with the joint portions of the headrest frame as a pair of laterally spaced clamp portions for frictional engagement with the upper horizontal portion of the support rod.

According to a further aspect of the present invention, the opposed plate-like body portions of the headrest frame each are formed with a pair of outwardly protruded portions between each pair of the joint portions.

According to a still another aspect of the present invention, the radial projection of the support rod is formed as an arched radial projection at the center of the upper horizontal portion of the support rod, and the cylindrical hinge portion of the headrest frame is formed with a pair of inwardly pressed portions which are engaged at their internal surfaces with opposite bottom sides of the arched radial projection of the support rod.

According to an aspect of the present invention, there is provided a tilt-type headrest mounted on an upper horizontal portion of an arched support rod to be mounted on a backrest of a passenger seat, which comprises a headrest frame formed with a cylindrical hinge portion retained in frictional engagement with the upper horizontal portion of the support rod and a pair of opposed plate-like body portions extending in parallel from the hinge portion, the plate-like body portions each being integrally formed with an inwardly curled rim portion at their upper peripheries and both side peripheries and formed with a joint portion at a central portion thereof, wherein the inwardly curled rim portions are engaged with each other in a condition where the headrest frame has been folded at the hinge portion to oppose the plate-like portions to one another; and means for clamping the opposed plate-like body portions at their joint portions to retain the cylindrical hinge portion in frictional engagement with the upper horizontal portion of the support rod; wherein the upper horizontal portion of the support rod is integrally formed with a radial projection at its center to be selectively engaged with opposed internal surfaces of the plate-like body portions for restricting forward or backward movement of the headrest frame, and wherein the headrest frame is covered with a headrest pad integrally formed therewith.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
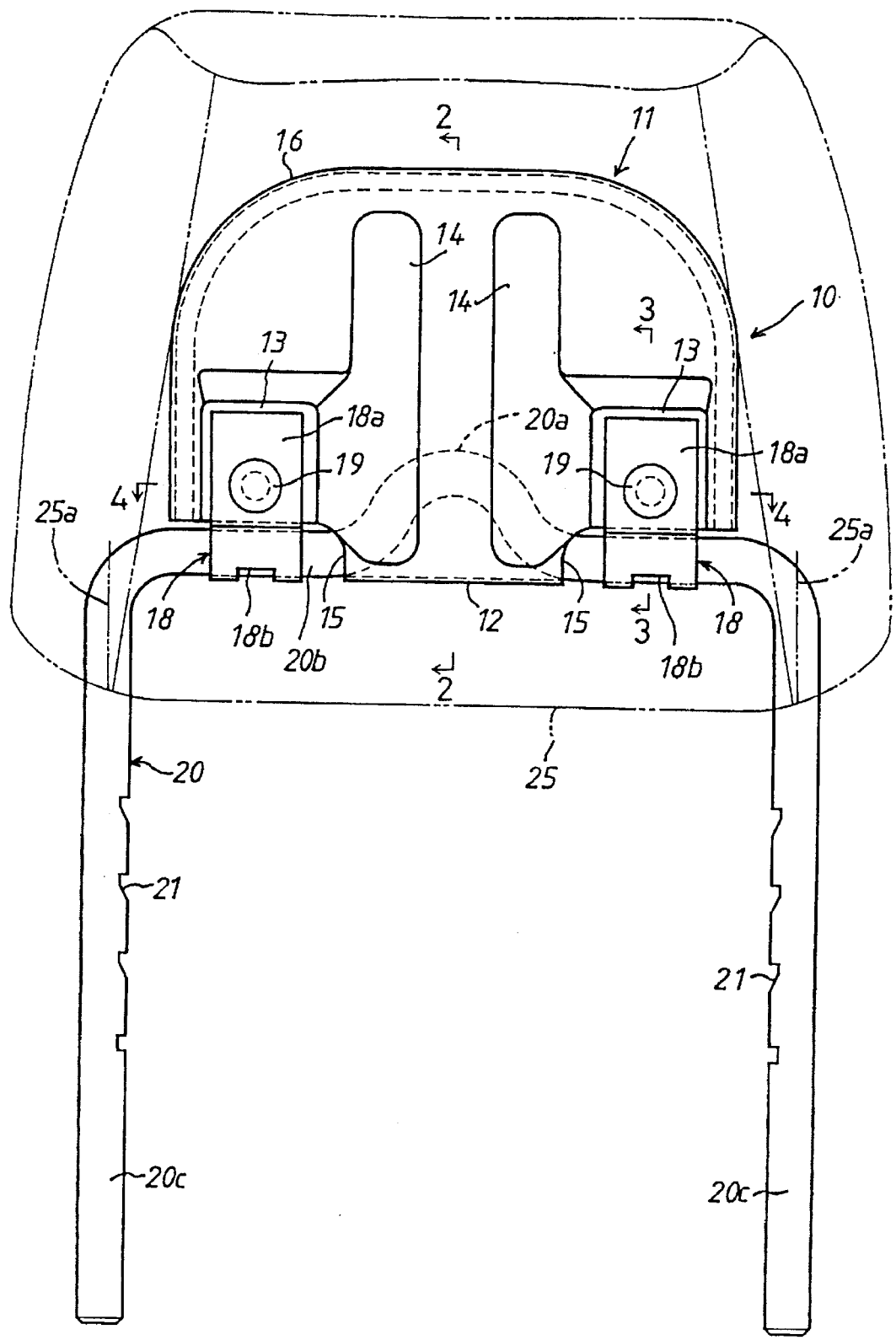
FIG. 1 a front view of a first embodiment of a tilt-type headrest in accordance with the present invention.
Figure 2:
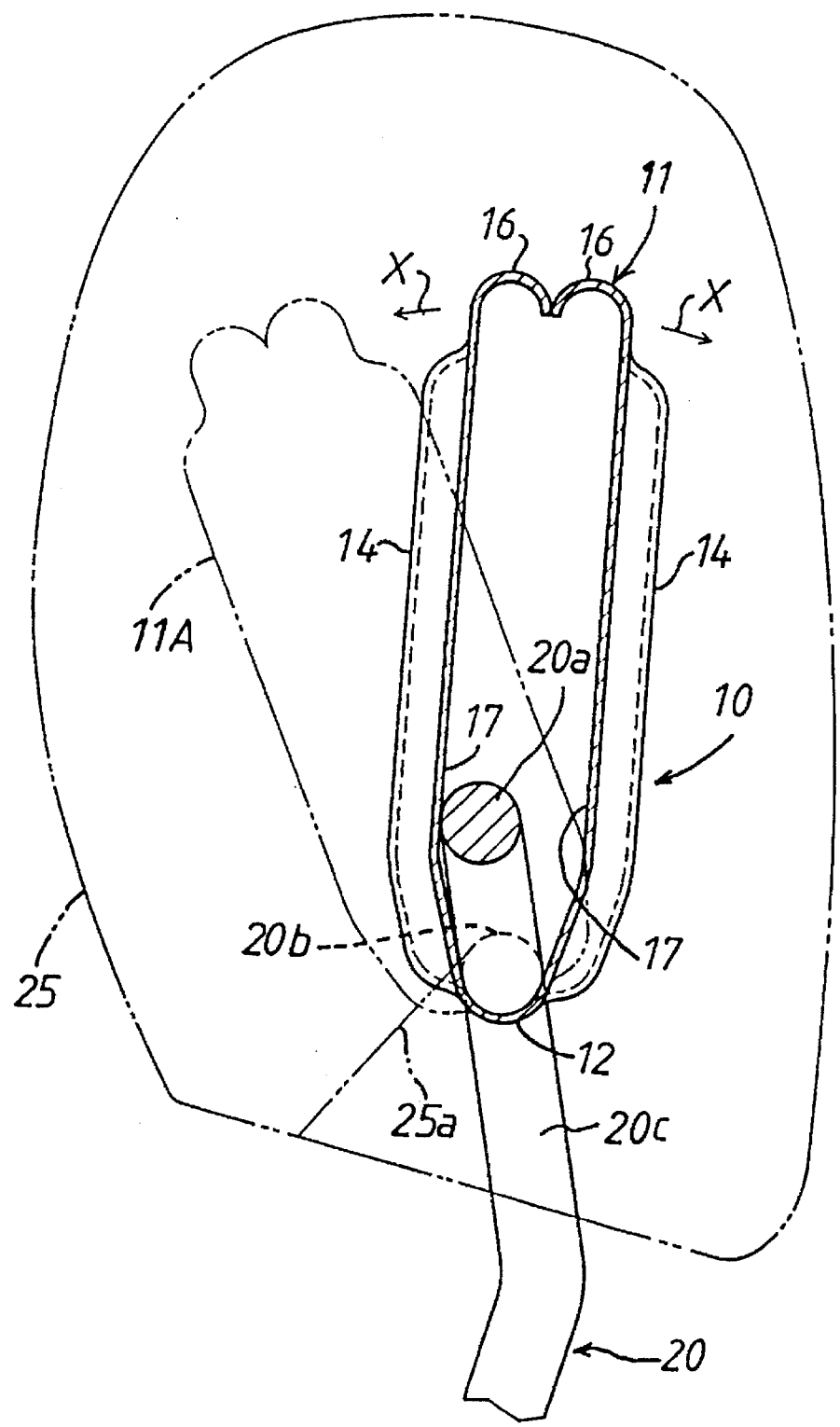
FIG. 2 is a sectional view taken along line 2—2 in FIG. 1.
Figure 3:
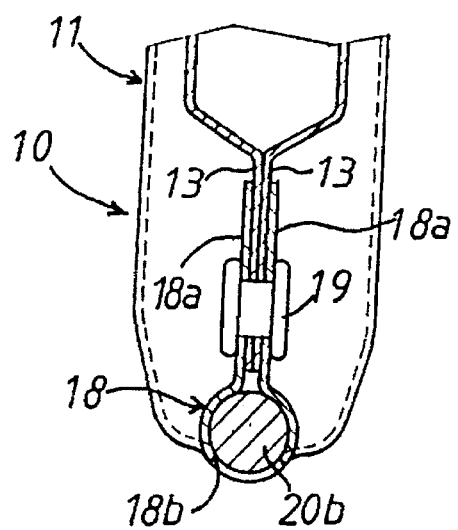
FIG. 3 is a sectional view taken along line 3—3 in FIG. 1.
Figure 4:
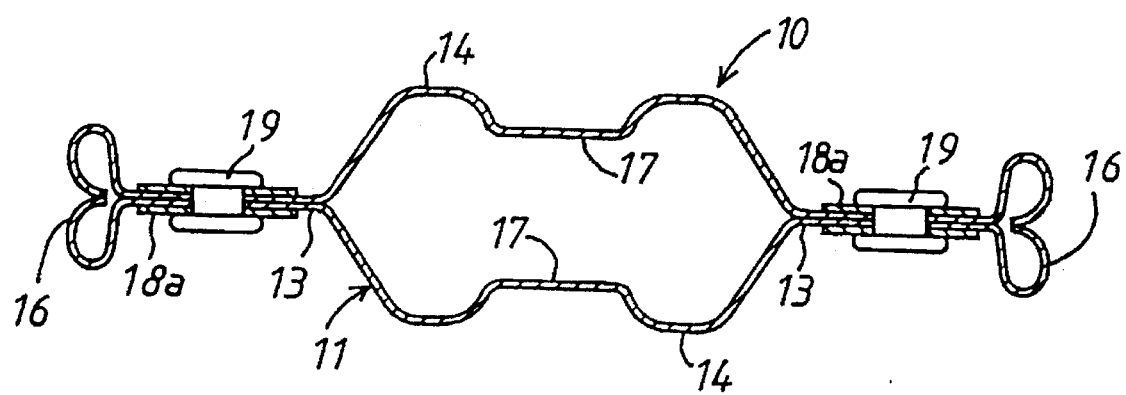
FIG. 4 is a sectional view taken along line 4—4 in FIG. 1.

Illustrated in FIGS. 1 to 4 is a first embodiment of a tilt-type headrest in accordance with the present invention wherein an insert assembly 10 tiltably mounted on an arched support rod 20 is composed of a headrest frame 11 and a pair of clamp members 18 riveted to the headrest frame 11. As clearly shown in FIGS. 1 and 2, the headrest frame 11 is made of steel sheet metal and formed with a pair of opposed plate-like body portions which are respectively formed with an inwardly curled rim portion 16 at their upper peripheries and both side peripheries and integrally connected at their lower ends to one another by means of a cylindrical hinge portion 12. As shown in FIGS. 1, 2 and 3, the plate-like body portions of headrest frame 11 each are formed at their lower portions with a pair of inwardly recessed joint portions 13 and formed with a pair of outwardly extruded portions 14. The rim portions 16 of headrest frame 11 each are inwardly curled by curling process. As shown in FIG. 2, the opposed internal surfaces of headrest frame 11 located between the extruded portions 14 are formed as a pair of stopper surfaces 17. In actual practice, the headrest frame 11 may be made of hard synthetic resin in the same construction as described above.

After stamping process, the headrest frame 11 is in an unfolded condition. When the plate-like body portions of headrest frame 11 are folded at the central hinge portion 12 and fitted at their joint portions 13, the curled rim portions 16 are engaged with each other at their inner ends. In such a folded condition of the headrest frame 11, a pair of circular openings 15 are formed at the opposite ends of the central hinge portion 12 to permit insertion of the support rod 21 therethrough. As shown in FIG. 1 and 3, the clamp members 18 each are formed with a cylindrical hinge portion and a pair of attachment portions 18a extending in parallel from the cylindrical hinge portion. After stamping process, the clamp members 18 each are in an unfolded condition.

As shown in FIGS. 1 and 2, the arched support rod 20 is made of a hollow metallic rod material and formed with a pair of leg portions 20c extending in parallel from the upper horizontal portion 20b. The upper horizontal portion 20b of support rod 20 is bent upward at its central portion to form an arched radial projection 20a. The leg portions 20c of support rod 20 each are formed with a plurality of vertically spaced notches 21 to be engaged with a corresponding stepped portion at a selected position when the leg portions 20c of support rod 20 have been inserted into mounting holes in the upper portion of a backrest of a passenger seat.

When the insert assembly 10 is mounted on the arched support rod 20, the upper horizontal portion 20b of support rod 20 is inserted into the unfolded headrest frame 11 in such a manner that the central arched radial projection 20a of support rod 20 is positioned in the central hinge portion 12 of headrest frame 11 as shown in FIG. 1. Thereafter, the unfolded clamp members 18 each are engaged with the upper horizontal portion 20b of support rod 20 at their cylindrical hinge portions, folded to engage the attachment portions 18a with the joint portions 13 of headrest frame 11 and fastened by a rivet 19 as shown in FIG. 3. As a result, the joint portions 13 and curled rim portions 16 of headrest frame 11 are engaged with each other, and the clamp members 18 are retained in frictional engagement with the upper horizontal portion 20b of support rod 20.

In the headrest assembly described above, the central arched radial projection 20a of support rod 20 is arranged to be engaged with a pair of opposed internal surfaces 17 of the headrest frame 11 for restricting forward or backward movement of the headrest frame 11 as shown by an imaginary line in FIG. 2. Thus, the headrest frame 11 is movable in an extent defined by the opposed internal surfaces 17 of headrest frame 11 and retained at a desired angle by frictional engagement with the upper horizontal portion 20b of support rod 20.

After assembled as described above, the insert assembly 10 and support rod 20 are set in a mold (not shown), and an amount of urethane resin added with a foaming agent is injected into the mold to form a headrest pad 25 integrally the insert assembly 10. The headrest pad 25 is formed with a pair of slits 25a for permitting forward or backward movement of the insert assembly 10 and headrest pad 25 on the support rod 20. The slits 25a are formed by an insert element disposed in the mold or a heated cutter. The headrest pad 25 is covered with a surface skin layer (not shown) which is also formed with a pair of slits corresponding with the slits 25a. Since the entire internal surface of headrest pad 25 is secured to the headrest frame 11 without forming any space, the elasticity of headrest pad 25 is uniformly obtained.

Since the interior space of the headrest frame 11 is enclosed by the central hinge portion 12 engaged with the upper horizontal portion 20b of support rod 20 and the curled rim portions 16 engaged with each other, the headrest pad 25 is formed without causing entry of the urethane resin into the interior space of headrest frame 11. This is useful to reduce the amount of urethane resin used for formation of the headrest pad 25 and to ensure smooth angular adjustment of the headrest. Although in the first embodiment, the clamp members 18 each are formed with a rectangular hole 18b at their cylindrical hinge portions to uniform engagement forces acting on the upper horizontal portion 20b of support rod 20, the rectangular hole 18b may be eliminated. Since the clamp members 18 are provided separately from the headrest frame 11, the thickness of clamp member 18 can be changed irrespectively of the thickness of headrest frame 11 to adjust rotary resistance of the headrest 11 against the upper horizontal portion 20b of support rod 20.

Figure 5:
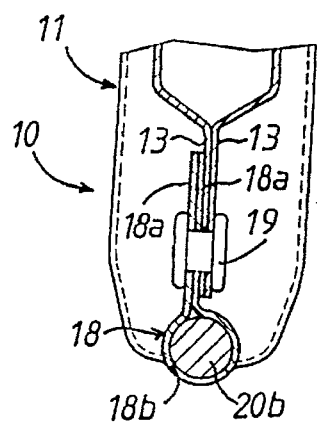
FIGS. 5 to 10 each are a sectional view illustrating modifications of a clamp member shown in FIG. 1 and its mounting construction.

Although in the first embodiment, the attachment portions 18a of clamp member 18 have been overlapped with the outside surfaces of the joint portions 13 of headrest frame 11, the joint portions 13 of headrest frame 11 may be overlapped with the attachment portions 18a of clamp member 18 in an engaged condition. Alternatively, as shown in FIG. 5, the attachment portions 18a of clamp member 18 in an engaged condition may be fastened to the joint portions 13 of headrest frame 11 in an engaged condition. With such a construction, the frictional rotary resistance between the upper horizontal portion 20b of support rod 20 and the insert assembly 10 in clockwise rotary movement becomes larger than that in counterclockwise rotary movement.

Figure 6:
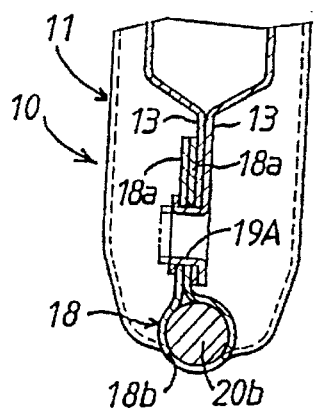

In a modification shown in FIG. 6, one of the joint portions 13 of headrest frame 11 is formed with a cylindrical projection 19A which is formed by burring and inserted into corresponding holes in the other joint portion 13 and the attachment portions 18a of clamp member 18. The cylindrical projection 19A of joint portion 13 is radially outwardly pressed at its distal end to fasten the attachment portions 18a of clamp member 18 to the joint portions 13 of headrest frame 11 without using the rivet 19. Alternatively, one of the attachment portions 18a of clamp member 18 shown in FIG. 3 may be formed with the cylindrical projection 19A shown in FIG. 6. In such a modification, the cylindrical projection 19A is inserted into corresponding holes in the joint portions 13 of headrest frame 11 and the other attachment portion 18a of clamp member 18 and is radially outwardly pressed at its distal end to fasten the attachment portions 18a of clamp member 18 to the joint portions 18 of headrest frame 11.

Figure 7:
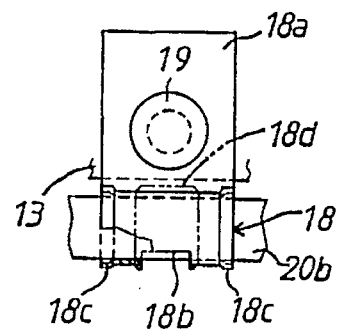

In another modification shown in FIG. 7, the cylindrical hinge portion of clamp member 18 is formed at its opposite ends with a pair of a radially outwardly expanded rims 18c and is retained in frictional engagement with the upper horizontal portion 20b of support rod 20 only at its intermediate portions. In this modification, even if inward burrs were formed at the opposite ends of the cylindrical hinge portion during burring process, damage of the upper horizontal portion 20b of support rod 20 would be avoided. In this case, the cylindrical hinge portion of clamp member 18 may be further formed with a pair of radially outwardly expanded rims 18d as shown by an imaginary line in FIG. 7.

Figure 8:
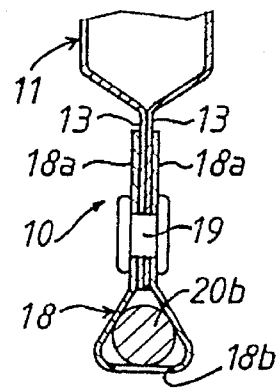

In a modification shown in FIG. 8, the hinge portion of clamp member 18 is formed in a triangle cross-section and is frictionally engaged with the upper horizontal portion 20b of support rod 20 at circumferential equally spaced three positions to reduce irregularity of rotary frictional resistance between the insert assembly 10 and the support rod 20 caused by manufacturing errors of the clamp member 18.

Figure 9:
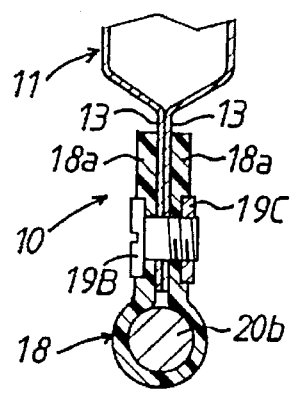

Although the clamp member 18 has been made of sheet metal, the clamp member 18 may be made of synthetic resin such as nylon, polyethylene or the like as shown in FIG. 9. In such a case, the clamp member 18 is engaged with the joint portions 13 of headrest frame 11 at its attachment portions 18a and fastened by a screw 19B and a nut 19C. One of the attachment portions 18a is formed with a recess for engagement with the nut 19C, while the other attachment portion 18a is formed with a recess for engagement with the head of fastening screw 19B.

Figure 10:
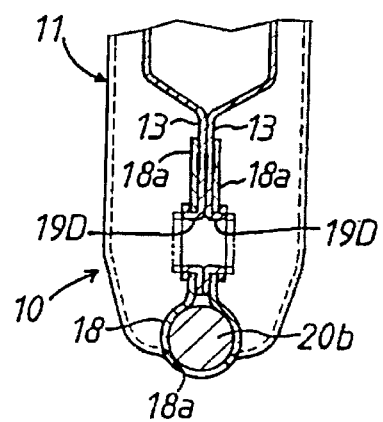

In a modification shown in FIG. 10, the joint portions 13 of headrest frame 11 each are formed with a cylindrical outward projection 19d by burring in an unfolded condition of the headrest frame 11 before assembled with the support rod 20. The cylindrical outward projections 19D of joint portions 13 each are inserted into a corresponding hole in the respective attachment portions 18a of clamp member 18 and pressed radially outwardly at their distal ends to fasten the attachment portions 18a of clamp member 18 to the joint portions 13 of headrest frame 11 thereby to assemble the insert assembly 10 with the support rod 20. In such assembly process, the headrest frame 11 in the unfolded condition is engaged with the upper horizontal portion 20b of support rod 20 at its hinge portion 12 and folded to engage the joint portions 13 and curled rim portions 16 with each other. Thereafter, the clamp member 18 is engaged with the upper horizontal portion 20b of support rod 20 at its hinge portion, coupled with the cylindrical outward projections 19D of joint portions 13 at its attachment portions 18a and welded to the joint portions 13 by spot welding.

Figure 11:
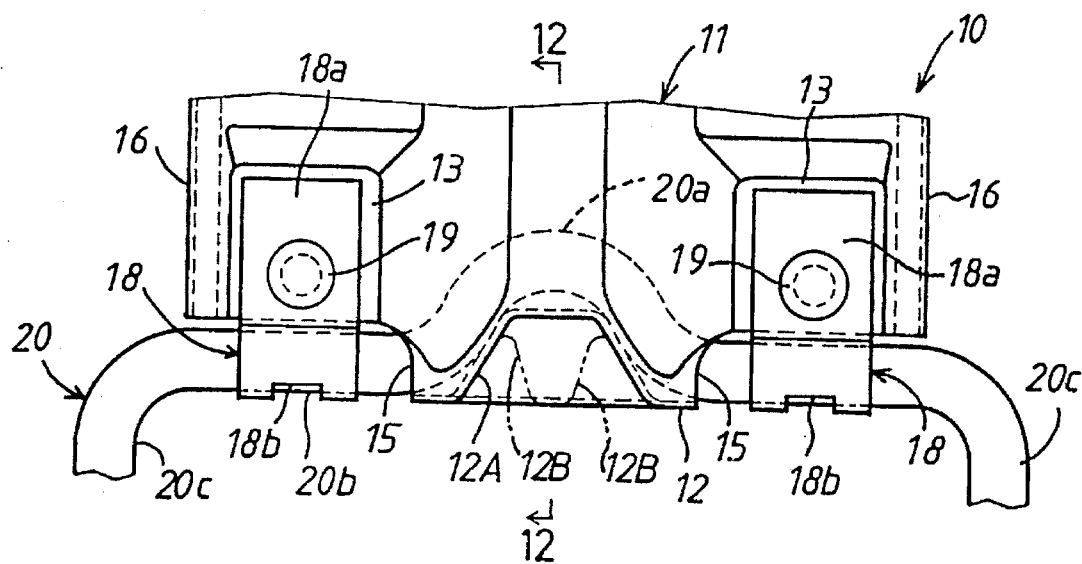
FIG. 11 is a front view illustrating a construction for positioning an insert member mounted on an arched support rod.
Figure 12:
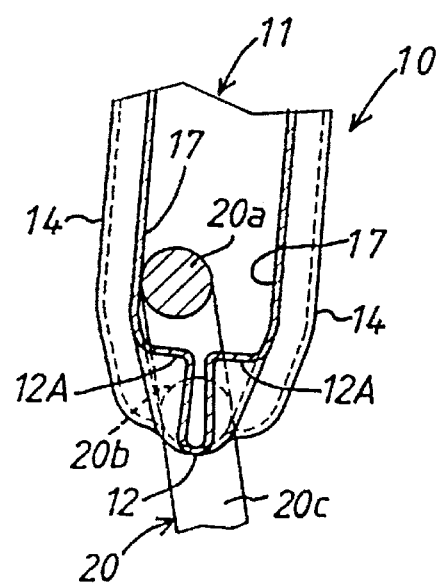
FIG. 12 is a sectional view taken along 12—12 in FIG. 11.

In a modification shown in FIGS. 11 and 12, the headrest frame 11 is formed at its hinge portion 12 with a pair of inwardly pressed portions 12A which are engaged at their internal surfaces with opposite bottom sides of the arched radial projection 20a of support rod 20 to restrict lateral displacement of the insert assembly 10 relative to the upper horizontal portion 20b of support rod 20 in such a manner as to permit forward or backward movement of the insert assembly 10 in the extent defined by the internal surfaces 17 of headrest frame 11. The pair of inwardly pressed portions 12A may be formed as shown by imaginary lines 12B in FIG. 11.

Figure 13:
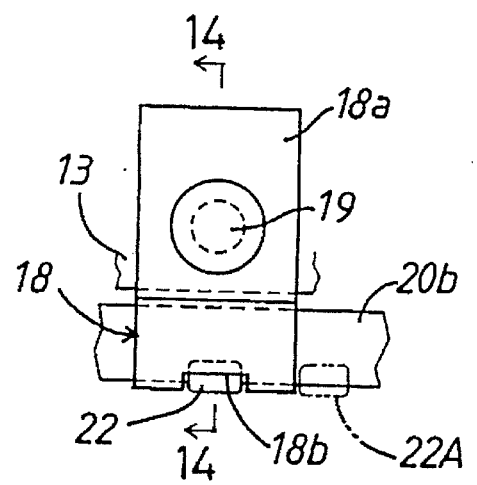
FIG. 13 is a front view illustrating a modification of the construction for positioning the insert member mounted on the arched support rod.
Figure 14:
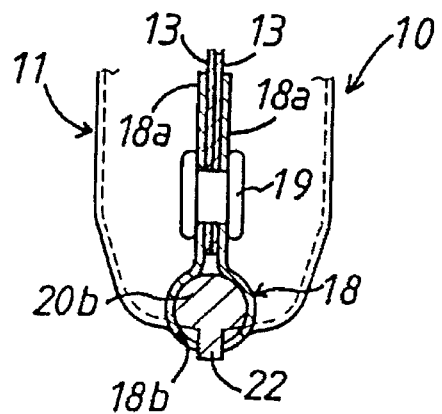
FIG. 14 is a sectional view taken along line 14—14 in FIG. 13.

In a modification shown in FIGS. 13 and 14, the upper horizontal portion 20b of support rod 20 is formed with a pressed radial projection 22 which is engaged with the rectangular hole 18b of clamp member 18 to restrict lateral displacement of the insert assembly 10 relative to the upper horizontal portion 20b of support rod 20 in such a manner as to permit forward or backward movement of the insert assembly 10. Alternatively, a radial projection 22A may be formed at one side of the clamp member 18 as shown by an imaginary line in FIG. 13. In such a case, the radial projection 22A is formed at each outside or inside of the pair of clamp members 18.

Figure 15:
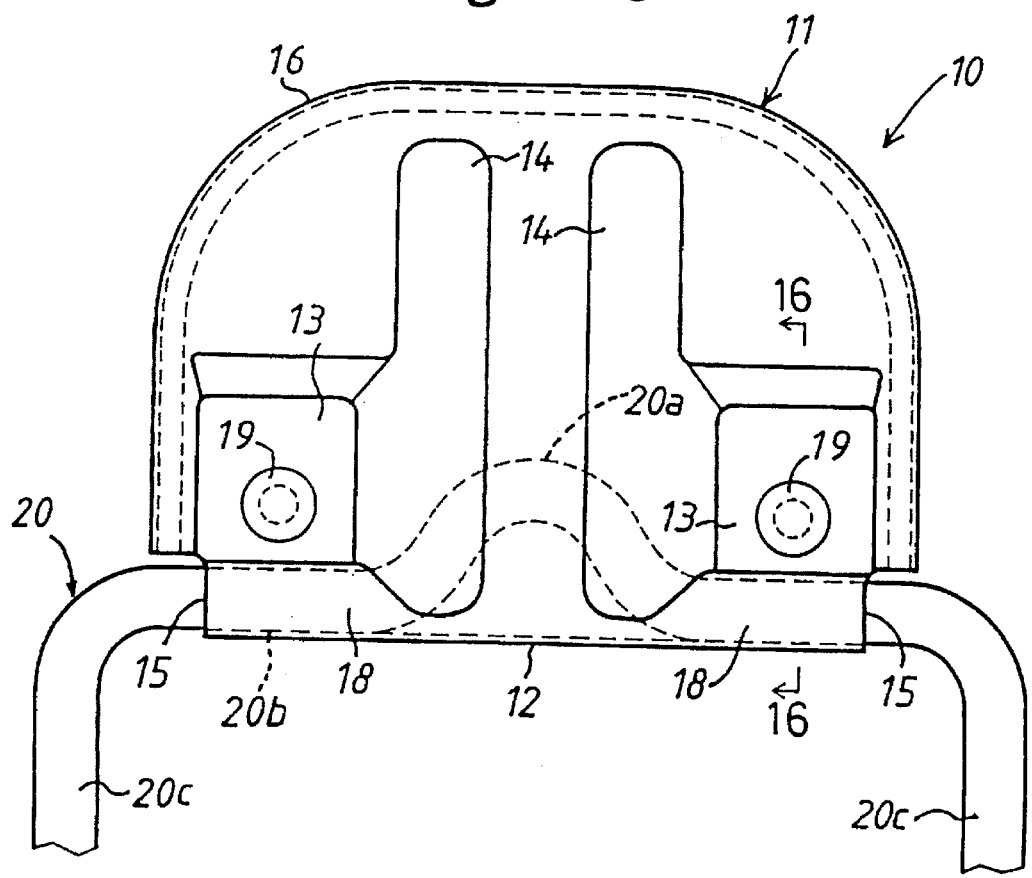
FIG. 15 is a front view of a second embodiment of a tilt-type headrest in accordance with the present invention.
Figure 16:
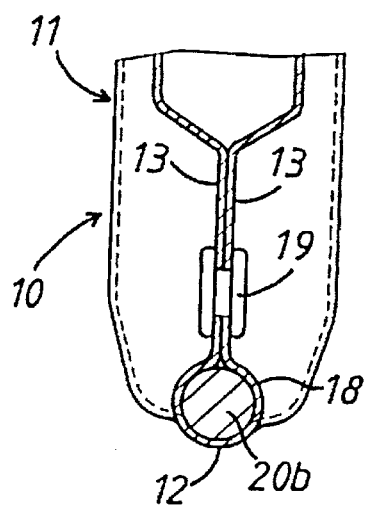
FIG. 16 is a sectional view taken along line 16—16 in FIG. 15.
Figure 17:
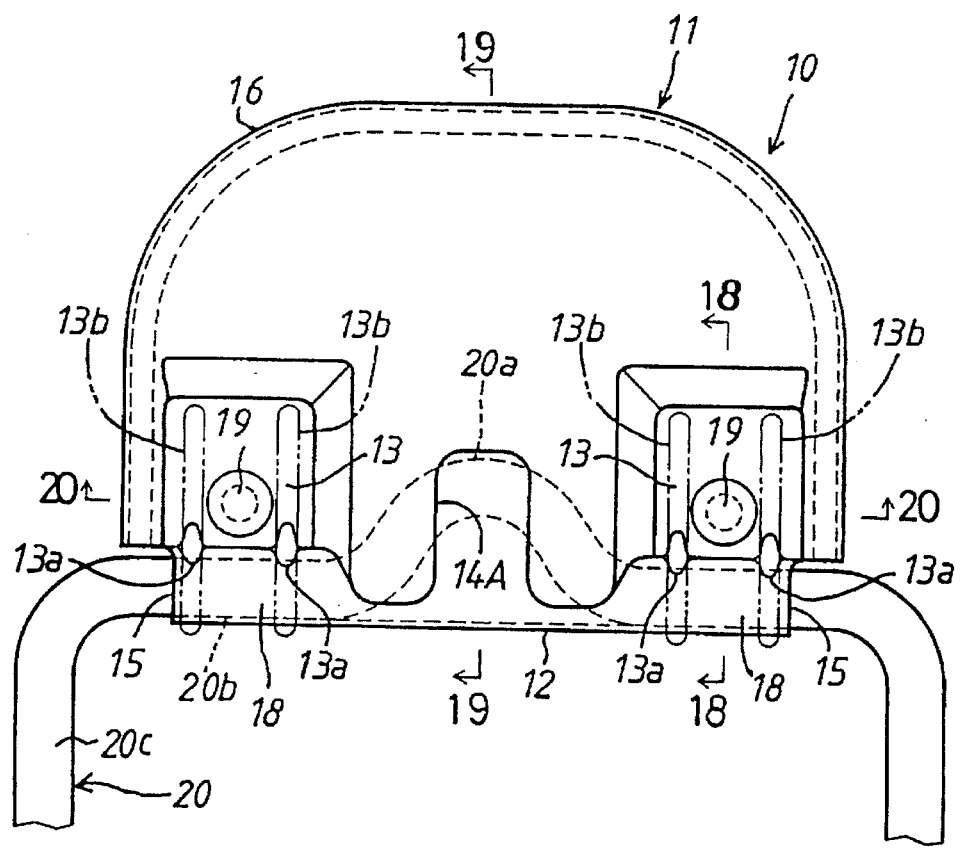
FIG. 17 is a front view of a third embodiment of a tilt-type headrest in accordance with the present invention.

Illustrated in FIGS. 15 and 16 is a second embodiment of the present invention wherein the pair of clamp members 18 in the first embodiment shown in FIG. 1 are integrally formed with the joint portions 13 of headrest frame 11 at the opposite ends of hinge portion 12. The other construction of this embodiment is substantially the same as that of the first embodiment. In this embodiment, the headrest frame 11 in the unfolded condition is engaged with the upper horizontal portion 20b of support rod 20 at its hinge portion 12 and clamp portions 18 and folded to engage the joint portions 13 with each other as shown in FIG. 16 and to engage the curled rim portions 16 with each other. Thereafter, the joint portions 13 are fastened by the rivet 19. Thus, the headrest frame 11 is mounted on the support rod 20 at the clamp portions 18 to be moved forward or backward.

Illustrated in FIGS. 17 to 20 is a third embodiment of the present invention wherein a pair of reinforcement ribs 13a are integrally formed with the clamp portion 18 and joint portion 13 in the second embodiment shown in FIG. 15. The other construction of this embodiment is substantially the same as that of the second embodiment. In this embodiment, the headrest frame 11 is formed at its central portion with a pair of inwardly pressed portions 14A the internal surfaces of which are formed as a pair of stopper surfaces to restrict forward or backward movement of the headrest frame 11 by engagement with the arched radial projection 20a of support rod 20. The reinforcement ribs 13a may be formed as a pair of parallel reinforcement ribs 13b integral with the clamp portion 18 and joint portion 13 as shown by imaginary lines in FIGS. 17 and 18. Since in the third embodiment, the interior space of the headrest frame 11 is enlarged in capacity, the amount of urethane resin used for forming the headrest pad 25 can be reduced.

Figure 18:
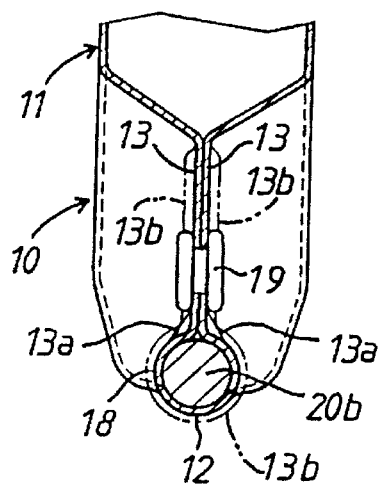
FIG. 18 is a partial sectional view taken along line 18—18 in FIG. 17.
Figure 19:
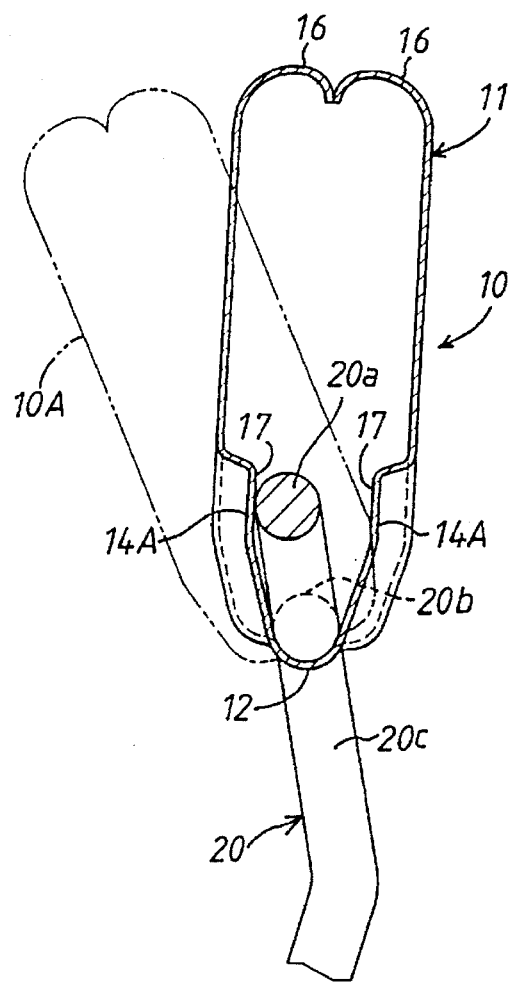
FIG. 19 is a sectional view taken along line 19—19 in FIG. 17.
Figure 20:
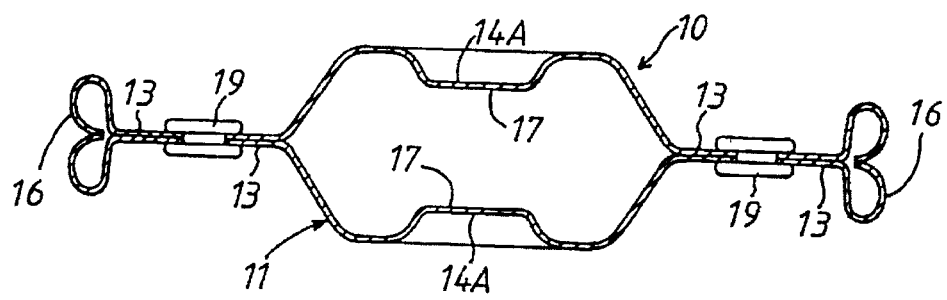
FIG. 20 is a sectional view taken along line 20—20 in FIG. 17.
Figure 21:
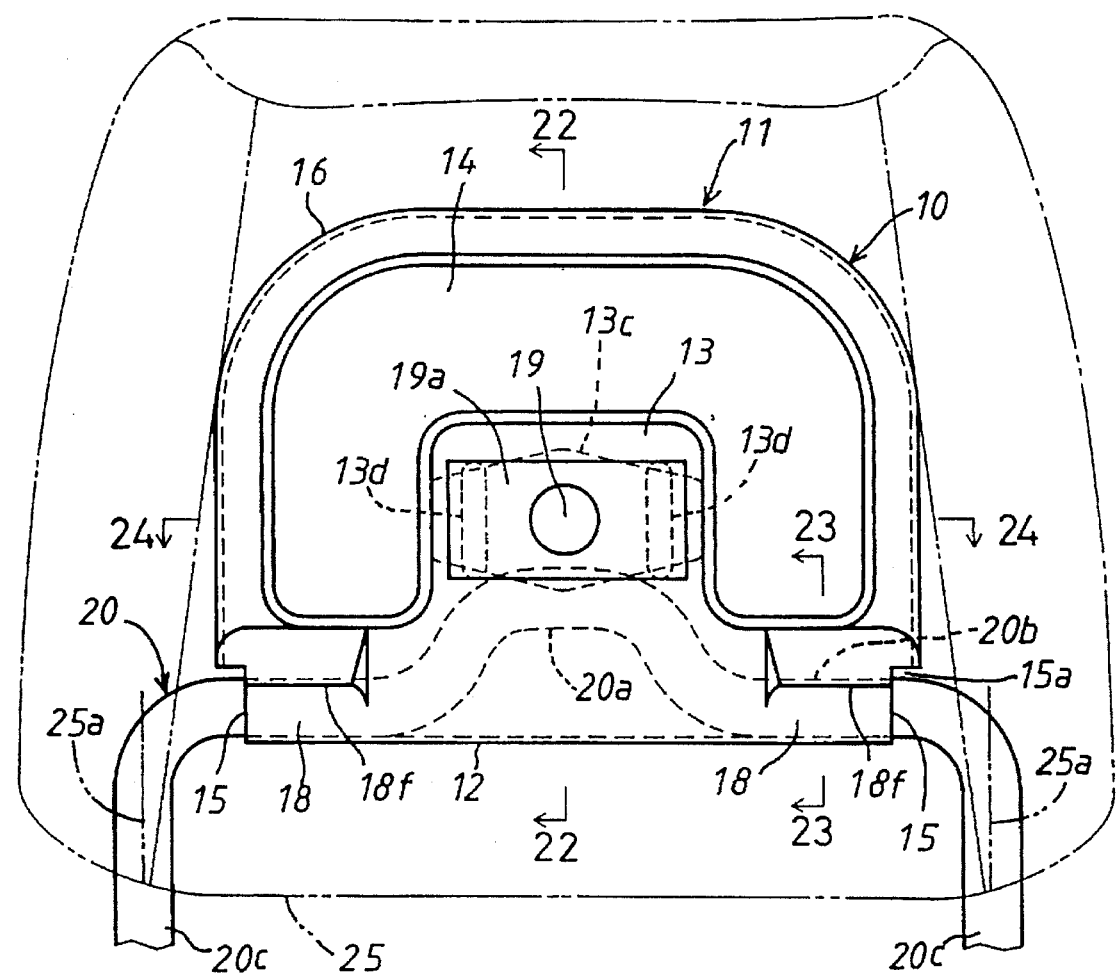
FIG. 21 is a front view of a fourth embodiment of a tilt-type headrest in accordance with the present invention.
Figure 22:
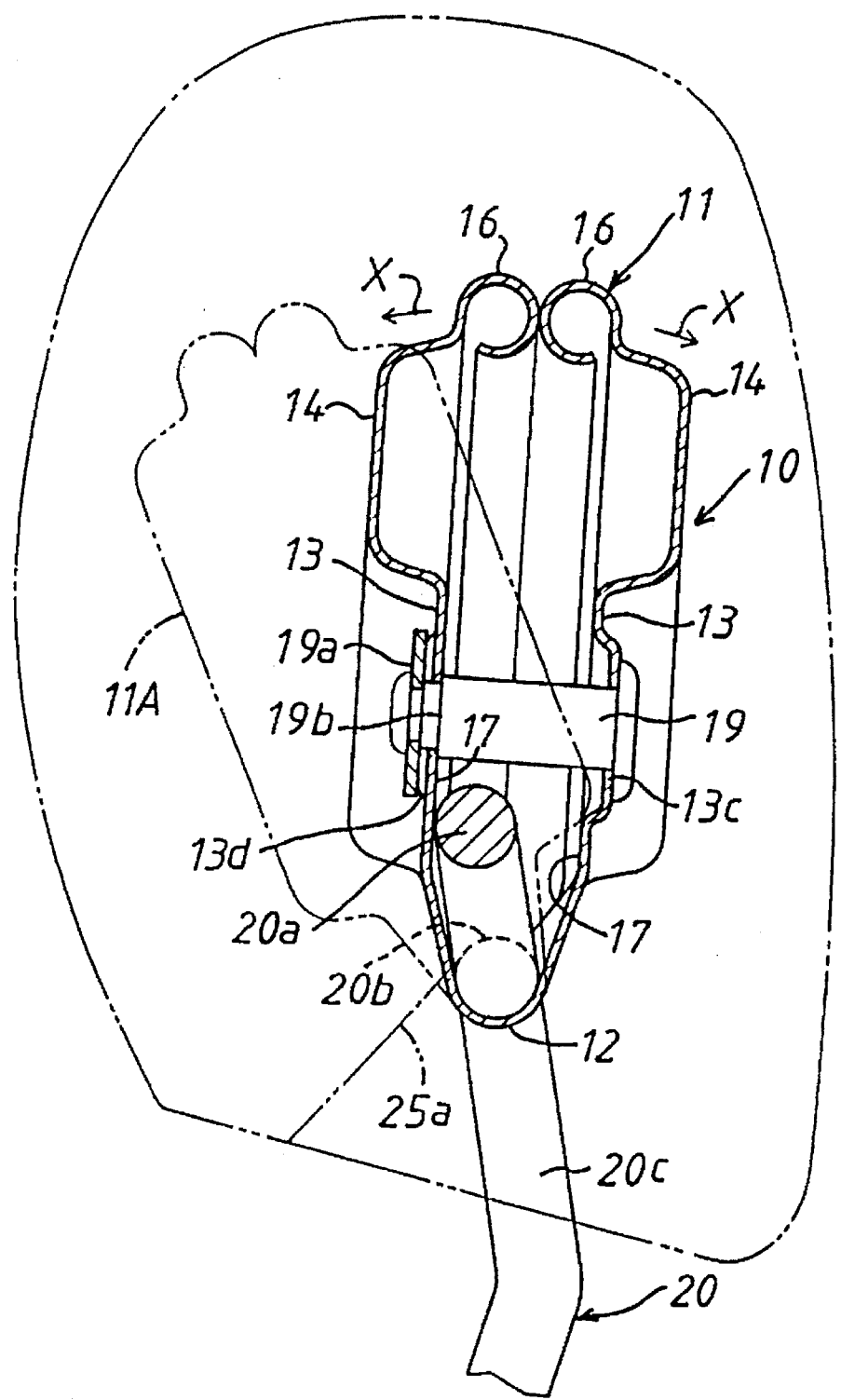
FIG. 22 is a sectional view taken along line 22—22 in FIG. 21.
Figure 23:
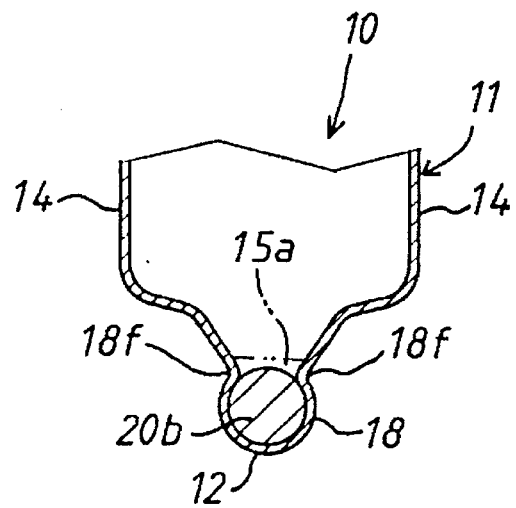
FIG. 23 is a partial sectional view taken along line 23—23 in FIG. 21.

Illustrated in FIGS. 21 to 24 is a fourth embodiment of the present invention wherein the pair of clamp portions 18 in the first embodiment shown in FIG. 1 are integrally formed with the headrest frame 11 as in the second embodiment shown in FIGS. 15 and 18. In this embodiment, the headrest frame 11 is formed at its central portion with a pair of opposed joint portions 13 in stead of the joint portions 13 shown in FIG. 1. The curled rim portions 16 of the headrest frame 11 are formed approximately circle in cross-section by curling process as shown in FIG. 22. The headrest frame 11 is formed with a pair of outwardly protruded portions 14 each of which is formed in a U-letter shape alone the curled rim portions 18. As shown in FIG. 22, the internal surface of opposed joint portions 13 are formed as a pair of opposed stopper surfaces for engagement with the arched radial projection 20a of support rod 20. As shown in FIGS. 21 and 23, the clamp portions 18 integral with the headrest frame 11 each are formed with a pair of inwardly pressed portions 18f to permit forward or backward movement of the headrest frame 11 at an angle of about 270'.

Figure 24:
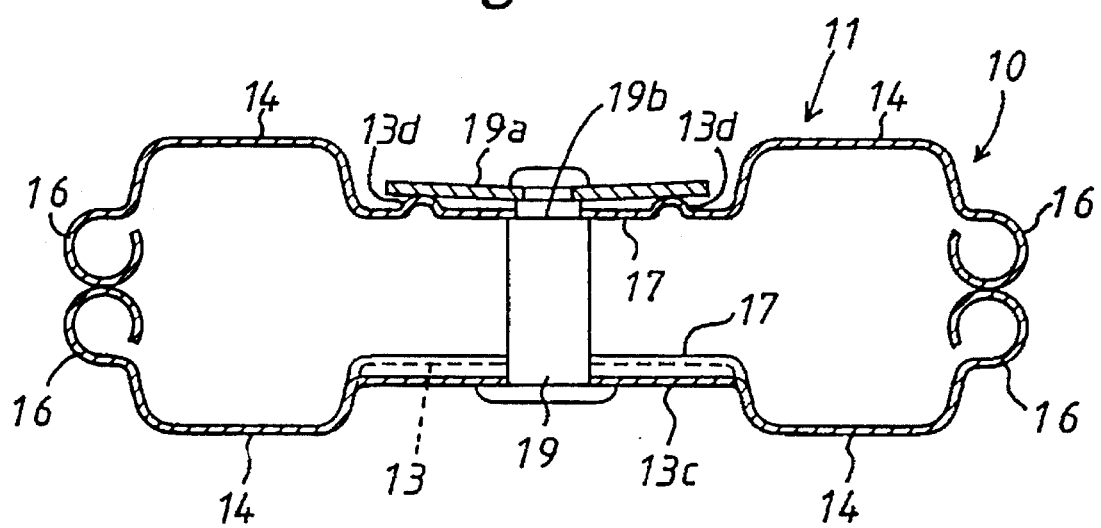
FIG. 24 is a sectional view taken along line 24—24 in FIG. 21.
Figure 25:
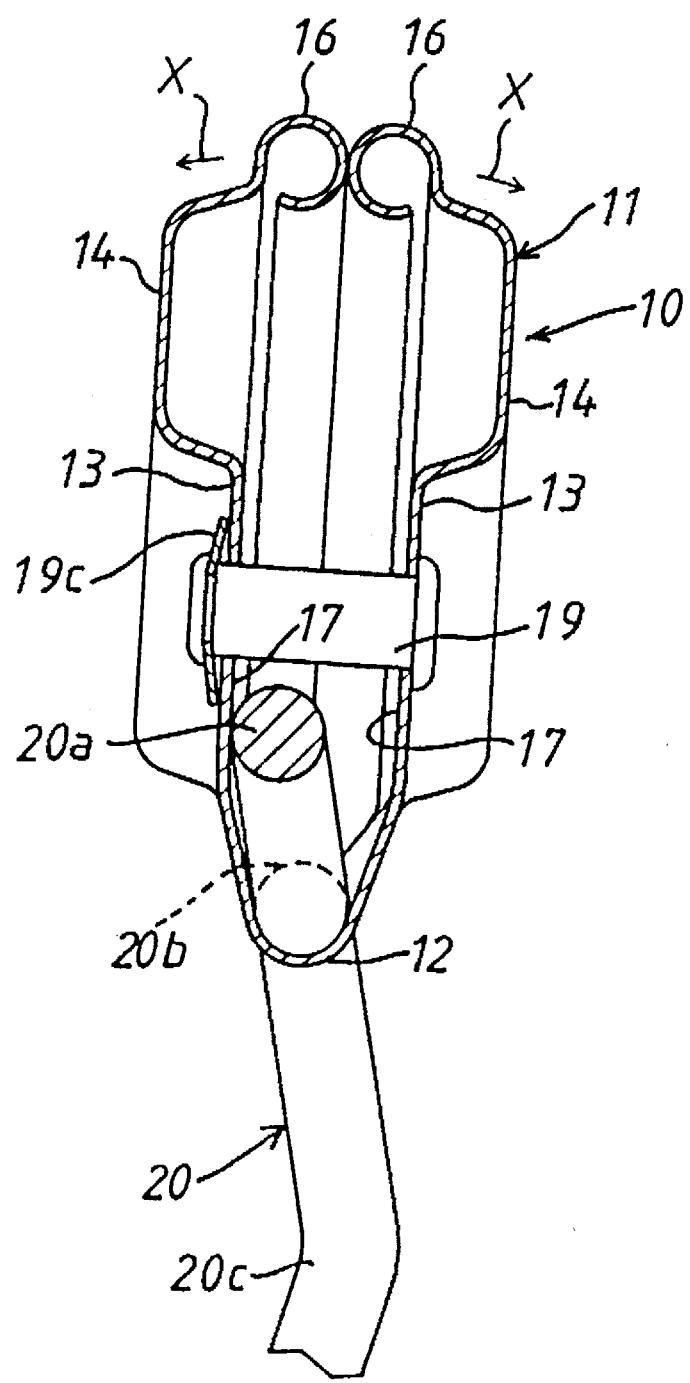
FIG. 25 is a sectional view illustrating a modification of the embodiment shown in FIG. 22.
Figure 26:
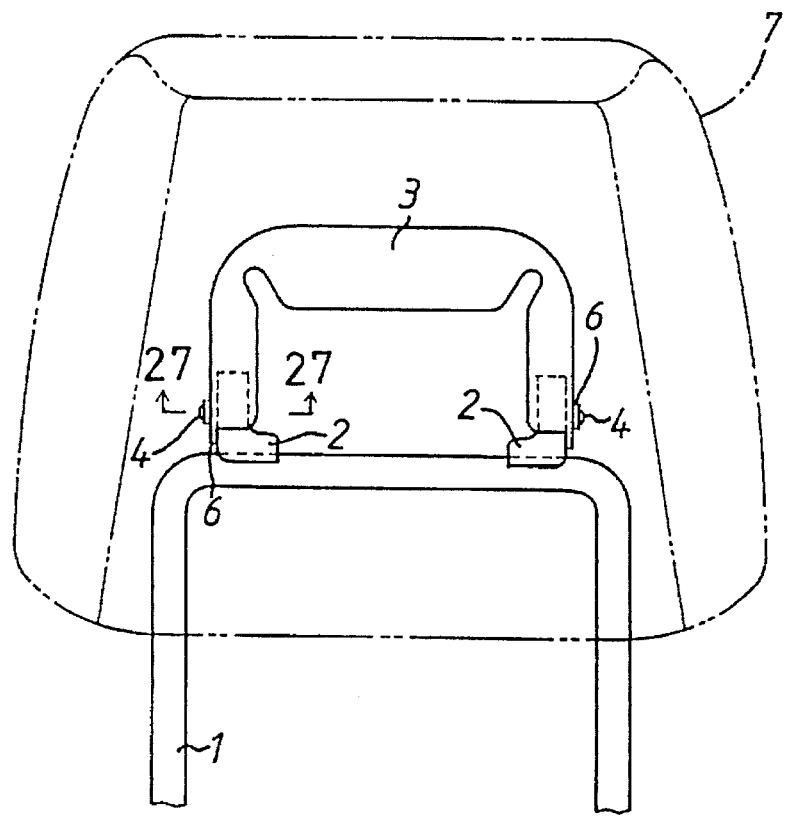
FIGS. 26 and 27 are illustrations of a conventional prior art headrest.
Figure 27:
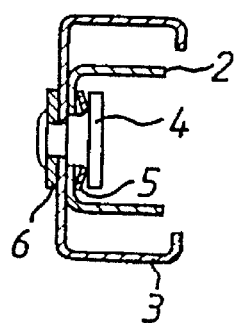

As shown in FIGS. 22 and 24, the front side joint portion 13 of headrest frame 11 is formed with an outwardly protruded portion 13c laterally extending in its entirety, while the backside joint portion 13 is formed with a pair of laterally spaced parallel outward projections 13d. A stepped rivet 19 inserted into a corresponding hole in the frontside joint portion 13 through the outwardly protruded portion 13c is inserted into a central hole of a leaf spring 19a retained on the parallel outward projections 13d and caulked to retain the clamp portions 18 in frictional engagement with the upper horizontal portion 20b of support rod 20 and to engage the curled rim portions 16 with each other. In a modification shown in FIG. 25, the outward protruded portion 13c and parallel projections 13d are eliminated from the joint portions 13, and the leaf spring 19a is replaced with a dish spring 19c.

What is claimed is:

1. A tilt-type headrest mounted on an upper horizontal portion of an arched support rod to be mounted on a backrest of a passenger seat, comprising:

a headrest frame formed with a cylindrical hinge portion retained in frictional engagement with the upper horizontal portion of said support rod and a pair of opposed plate-like body portions extending in parallel from said hinge portion, said plate-like body portions each being integrally formed with an inwardly curled rim portion at their upper peripheries and both side peripheries and formed with a pair of laterally spaced joint portions at both sides of said cylindrical hinge portion, wherein the inwardly curled rim portions and the joint portions of said plate-like body portions are engaged with each other in a condition where said headrest frame has been folded at said hinge portion to oppose said plate-like portions to one another; and a pair of laterally spaced clamp members each formed with a cylindrical hinge portion retained in frictional engagement with the upper horizontal portion of said support rod and a pair of attachment portions extending in parallel from the hinge portion of each of said clamp members and fastened to each pair of the joint portions of said opposed plate-like portions;

wherein the upper horizontal portion of said support rod is integrally formed with a radial projection at its center to be selectively engaged with opposed internal surfaces of said plate-like body portions for restricting forward or backward movement of said headrest frame, and wherein said headrest frame and said clamp members are covered with a headrest pad integrally formed therewith.

2. A tilt-type headrest as claimed in claim 1, wherein said headrest pad is integrally formed with said headrest frame by foaming process in a condition where said headrest has been assembled with the upper horizontal portion of said support rod.

3. A tilt-type headrest as claimed in claim 1, wherein said opposed plate-like body portions of said headrest frame each are formed with a pair of outwardly protruded portions between each pair of said joint portions.

4. A tilt-type headrest as claimed in claim 1, wherein said radial projection of said support rod is formed as an arched radial projection at the center of the upper horizontal portion of said support rod, and wherein the cylindrical hinge portion of said headrest frame is formed with a pair of inwardly pressed portions which are engaged at their internal surfaces with opposite bottom sides of the arched radial projection of said support rod.

5. A tilt-type headrest as claimed in claim 1, wherein said pair of clamp members are integrally formed with the joint portions of said headrest frame as a pair of laterally spaced clamp portions for frictional engagement with the upper horizontal portion of said support rod.

6. A tilt-type headrest as claimed in claim 5, wherein said pair of clamp portions integral with the joint portions of said headrest frame each are formed with a vertical reinforcement rib.

7. A tilt-type headrest mounted on an upper horizontal portion of an arched support rod to be mounted on a backrest of a passenger seat, comprising:

a headrest frame formed with a cylindrical hinge portion retained in frictional engagement with the upper horizontal portion of said support rod and a pair of opposed plate-like body portions extending in parallel from said hinge portion, said plate-like body portions each being integrally formed with an inwardly curled rim portion at their upper peripheries and both side peripheries and formed with a joint portion at a central portion thereof, wherein the inwardly curled rim portions are engaged with each other in a condition where said headrest frame has been folded at said hinge portion to oppose said plate-like portions to one another; and means for clamping said opposed plate-like body portions at their joint portions to retain the cylindrical hinge portion in frictional engagement with the upper horizontal portion of said support rod;

wherein the upper horizontal portion of said support rod is integrally formed with a radial projection at its center to be selectively engaged with opposed internal surfaces of said plate-like body portions for restricting forward or backward movement of said headrest frame, and wherein said headrest frame is covered with a headrest pad integrally formed therewith.

* * * * *